Jan. 23, 1951  G. B. HATCH  2,539,305
THRESHOLD TREATMENT OF WATER
Filed Oct. 9, 1943
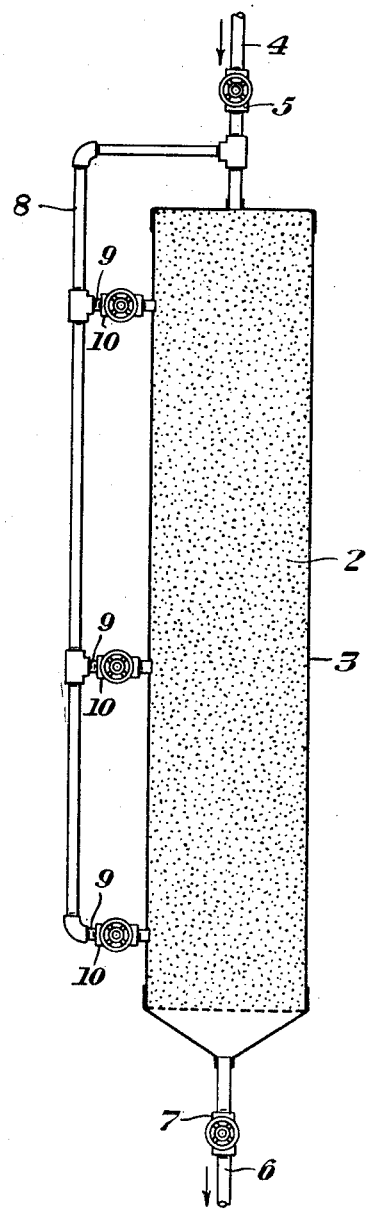
INVENTOR
George B. Hatch Patented Jan. 23, 1951

2,539,305

UNITED STATES PATENT OFFICE 2,539,305

THRESHOLD TREATMENT OF WATER

George B. Hatch, Pittsburgh, Pa., assignor to Hall Laboratories, Inc., a corporation of Pennsylvania Application October 9, 1943, Serial No. 505,605

5 Claims. (Cl. 210—23)

This invention relates generally to the treatment of water and more particularly to the treatment of water to prevent the precipitation of calcium carbonate when the water is heated or when alkali is added to the water.

This application is a continuation-in-part of my application, Serial No. 222,258, filed July 30, 1938, which has become abandoned.

It is now known to treat water to prevent the precipitation of calcium carbonate therefrom by adding to the water small amounts of the sodium phosphate glass known as sodium hexametaphosphate or Graham's salt. This sodium phosphate glass is very rapidly water-soluble and in its use it is common to form a strong solution of the Graham's salt and to supply the solution to the water which is to be treated. The control of the addition of the Graham's salt is rather complicated and requires the attention of an operator. For small installations, particularly where the flow of water is intermittent or where the system does not have the active supervision of a skilled operator, it is very difficult to control the addition of the Graham's salt. It is in installations of this type that the present invention is particularly appicable, although it may be employed in other systems also.

I have found that the small amounts of metaphosphate or other molecularly dehydrated phosphate radical which need be supplied to water to prevent or inhibit the precipitation of calcium carbonate when the water is heated or has an alkali added to it, may be supplied to the water in a simpler manner and with as good or better results by flowing the water in contact with a bed of molecularly dehydrated phosphate which is only very slowly water-soluble as contrasted with the previously used solutions of the very rapidly water-soluble Graham's salt. The very slowly water-soluble molecularly dehydrated phosphates which I employ are so slowly soluble that they are sometimes referred to herein as "water insoluble" to distinguish them from the rapidly water-soluble phosphates such as Graham's salt. The very slowly water-soluble molecularly dehydrated phosphates may be placed in a column and the water to be treated flowed through the column. The phosphate is employed somewhat in the manner of a filter and is capable of supplying to the water the small amounts of metaphosphate or other molecularly dehydrated phosphate radical required to inhibit the precipitation of calcium carbonate.

In the accompanying drawing which illustrates in a diagrammatic manner an installation which may be employed in accordance with the present invention, the very slowly water-soluble molecularly dehydrated phosphate 2 is contained in a column 3. As an example, the very slowly water-soluble molecularly dehydrated phosphate 2 may be in the form of glass particles and of the composition $CaO.P_2O_5$. This is a glass having a nominal calcium metaphosphate composition. The phosphate is preferably placed in a cloth or wire-mesh screen within the column and the water to be treated is supplied through a conduit 4 controlled by a valve 5. An outlet conduit 6 controlled by a valve 7 is connected to the bottom of the column. A by-pass conduit 8 provided with branches 9 controlled by valves 10 is connected to the conduit 4 in such a manner that the water to be treated may be passed through different heights of the column in order to regulate the amount of molecularly dehydrated phosphate which is supplied to the water. The water to be treated may be passed through the entire column or by means of the branches 9 may be passed through any desired portion of the column. Another way in which the amount of molecularly dehydrated phosphate fed to the water may be controlled is by controlling the size of the phosphate particles. Instead of flowing the water to be treated downwardly through the column it could, of course, be flowed upwardly or in any other direction.

Another arrangement is to connect the column holding the molecularly dehydrated phosphate by a short connection only at the bottom end to the line through which the water flows. It is preferred that air be removed from the column and that water completely cover the molecularly dehydrated phosphate. The latter dissolves slowly and diffuses in solution until it reaches the main line where it mingles with the water to be treated.

Although in any case it is only necessary to add fresh very slowly soluble molecularly dehydrated phosphate to the column at relatively long intervals, say weekly, monthly or yearly, the column should be provided with a suitable quick-opening cover so that the addition of a fresh charge is facilitated.

The amount of molecularly dehydrated phosphate supplied to the water in accordance with the present invention is, generally speaking, very small. The molecularly dehydrated phosphate, for example metaphosphate, is supplied in amounts which are substantially less than required to stoichiometrically combine with the calcium in the water. In general, only a few parts of the metaphosphate per million parts of water are employed, say of the order of up to 10 or 20 parts per million of water. This constitutes only, say, 1/100 to 1/1000 or 1/2000 of the stoichiometric amount required for reaction with the calcium to tie it up in a soluble complexion. These small amounts of very slowly soluble metaphosphate or other molecularly dehydrated phosphates hereinafter referred to are designated "threshold amounts" and the process of treating water wherein these small amounts are employed is referred to as the "threshold" treatment of water.

I have found that any molecularly dehydrated phosphate which is only very slowly water-soluble may be employed in my process. The rate of solution in water of the molecularly dehydrated phosphates which I employ is of an entirely different order from that of the metaphosphates which are commonly designated as water-soluble. For example, if one pound of the sodium phosphate glass commonly known as sodium hexametaphosphate or Graham's salt, when used in the commercial form of flat pieces of broken glass approximately $\frac{3}{32}$ inch thick, is suspended in one pound of water at room temperature it will all dissolve in, say, one to two hours, thereby producing a 50% solution of sodium hexametaphosphate. This 50% solution contains 500,000 P. P. M. As contrasted with this, $CaO.P_2O_5$ glass which is one of the water insoluble molecularly dehydrated phosphates used according to the present invention, will only dissolve in water under the same conditions just referred to, to the extent of about 200 to 500 P. P. M.; that is, to the extent of 0.02% to 0.05%. Crystalline $Ca(PO_3)_2$ will only dissolve under the same conditions to the extent of about three parts per million. Under these conditions the strength of the calcium metaphosphate solution is less than $\frac{1}{10}$% as contrasted with the 50% solution of sodium hexametaphosphate. In other words, the amount of calcium metaphosphate dissolved under the given conditions was less than 1/500 the amount of sodium hexametaphosphate.

Among the very slowly soluble molecularly dehydrated phosphates which may be used according to the present invention, the following may be mentioned:

1. Calcium metaphosphate in either its glassy or crystalline form.
2. Potassium metaphosphate in its crystalline form.
3. Insoluble crystalline sodium metaphosphate (Maddrell salt).
4. Acid sodium phosphate glass.
5. Glassy molecularly dehydrated phosphates of sodium and calcium, sodium and magnesium or calcium and magnesium.
6. Zinc molecularly dehydrated phosphate in either its glassy or crystalline form.
7. Aluminum molecularly dehydrated phosphate in either its glassy or crystalline form.
8. Strontium molecularly dehydrated phosphate in either its glassy or crystalline form.
9. Molecularly dehydrated sodium phosphate glass containing boron oxide.

The glassy calcium metaphosphate may be made by heating monobasic calcium orthophosphate to dehydrate it, then fusing it at 1,000° C. and then rapidly cooling it to prevent the formation of crystals.

The crystalline calcium metaphosphate may be made by heating monobasic calcium orthophosphate to dehydrate it at a temperature of about 500° C. The cooled product is in the form of crystalline calcium metaphosphate.

Calcium metaphosphate, either crystalline or glassy, may be made in other ways. Calcium carbonate and orthophosphoric acid are mixed in the proportions of one mol of $CaCO_3$ to two mols of the acid. This mixture is then heated to drive off the carbon dioxide and molecularly combined water at a relatively low temperature, preferably between 300° C. and 500° C. The mass is then heated to fusion, which may require a temperature of 1,000° C. or greater. The fused mass is then rapidly chilled, in order to produce glassy calcium metaphosphate, or slowly cooled, in order to produce crystalline calcium metaphosphate. The crystalline calcium metaphosphate may be made by starting with the same mixtures in the proportions mentioned and heating to 500° C. and then cooling either slowly or rapidly.

The water insoluble crystalline potassium metaphosphate may be made by starting with a mixture of potassium chloride and orthophosphoric acid in the proportions of one mol of potassium chloride to one mol of phosphoric acid. This mixture is heated to a relatively low temperature, preferably between 300 and 500° C., and then allowed to cool. Another method is to fuse the same mixture of starting materials at a temperature above 800° C. and then cool the fused mass. It requires extremely rapid chilling of this fused mixture to produce glassy potassium metaphosphate. The crystalline water-insoluble potassium metaphosphate is formed under all but the most drastic conditions of chilling.

Water insoluble crystalline sodium metaphosphate may be made by heating monosodium dihydrogen orthophosphate to a temperature above 250° C. but below 500° C., in order to dehydrate it, and then cooling it either slowly or quickly.

Acid sodium phosphate glass having a molecular ratio of $Na_2O$ to $P_2O_5$ of less than 1:1 may be made by starting with a mixture of sodium carbonate and orthophosphoric acid, which mixture contains less than one mol of sodium carbonate to two mols of phosphoric acid. This mixture is then heated to fusion and cooled rapidly.

Sodium metaphosphate glass, $NaPO_3$, and phosphorous pentoxide glass, $P_2O_5$, may be regarded as the end members of the glassy acid sodium metaphosphates. Both of these end members are readily soluble in water, but glasses of intermediate composition are relatively insoluble. By varying the composition, it is thus possible to control the rate of solution. For example, a glass containing nominally 15% of $P_2O_5$ and 85% of $NaPO_3$ goes into solution at only a very slow rate, compared to sodium metaphosphate glass of the formula $NaPO_3$. By varying the relative amounts of sodium carbonate and orthophosphoric acid used in the initial mixture, acid sodium metaphosphate glasses of varying composition and properties may readily be produced.

A mixed calcium-sodium water-insoluble metaphosphate may be made by starting with a mixture of sodium carbonate, calcium carbonate, and orthophosphoric acid. The starting materials should be in the ratio of one mol of total carbonate to two mols of orthophosphoric acid. The properties of the mixed metaphosphates may be varied by controlling the ratio of sodium carbonate to calcium carbonate. Thus if a mixed metaphosphate glass with a rate of solution greater than that of calcium metaphosphate but less than that of sodium metaphosphate is desired, one mol of calcium carbonate and one mol of sodium carbonate might be mixed with four mols of orthophosphoric acid, dehydrated, fused and chilled to give a glassy product.

The metaphosphates of zinc, aluminum or strontium may be made in a manner similar to that described for the production of calcium metaphosphate.

Sodium phosphate glass containing boron oxide may be made in a manner similar to that now commonly used for making Graham's salt, modified however by including the required amount of boron oxide or sodium borates in the batch before fusing it.

Any of the very slowly soluble molecularly dehydrated phosphates previously or hereinafter mentioned may be employed for treating water in accordance with my invention. Apparently any very slowly water-soluble molecularly dehydrated phosphate may be employed irrespective of the particular metal of the molecularly dehydrated phosphate.

The use of very slowly water-soluble molecularly dehydrated phosphates is applicable to any process of treating water wherein it is desired to supply small amounts of metaphosphate or other molecularly dehydrated phosphate radical to the water. One of the most important applications of the threshold treatment is to prevent the after-precipitation of calcium carbonate following softening of water by the lime or lime-soda processes. It may be used in connection with the treatment of irrigation water to which ammonia is added. The ammonia has a tendency to precipitate calcium carbonate from the water, but this tendency is inhibited if the water is first passed through a column containing the water insoluble molecularly dehydrated phosphate, in order to supply a small amount of molecularly dehydrated phosphate radical to the water. It is also applicable to cases where the water is heated, which would normally drive off carbon dioxide from the bicarbonate-containing water and result in the precipitation of calcium carbonate. Threshold treatment with water insoluble metaphosphate or other molecularly dehydrated phosphate according to my invention inhibits this precipitation of the calcium carbonate.

I have referred in the preceding description of the invention particularly to the production and use of the very slowly soluble alkali-metal metaphosphates and the alkaline earth metal metaphosphates and the mixed metaphosphates containing two or more of alkali-metal metaphosphates, alkaline earth metaphosphates and magnesium metaphosphates which may be in either their glassy or crystalline forms. It should be understood, however, that the alkali-metal or alkaline earth metal or magnesium or other metal pyrophosphates or tripolyphosphates, or mixtures thereof, or any glassy or crystalline molecularly dehydrated phosphate of the alkali-metals or alkaline earth metals or magnesium or other metal, or mixtures thereof, which are only very slowly water-soluble may be used in place of or in addition to the metaphosphates. The pyrophosphates or tripolyphosphates or the glassy molecularly dehydrated phosphates of corresponding nominal compositions may be made in the same general manner as described for the metaphosphates except that the proportions of starting materials are different from those used in making the metaphosphates. Thus in the preparation of the mixed calcium-sodium water insoluble metaphosphate previously described, one mol of total carbonate was used for each two mols of orthophosphoric acid. The ratio of metal carbonate or oxide to orthophosphoric acid may be varied over rather a wide range, so that the ratio of total carbonate or oxide to orthophosphoric acid may vary from considerably less to considerably more than the given ratio of 1:2 for the metaphosphate composition, where the pyrophosphates, tripolyphosphates or mixtures of either of them with metaphosphates are used as the water insoluble phosphate. The rate of solution and other properties will vary with change in composition. Calcium pyrophosphate, magnesium pyrophosphate and zinc pyrophosphate made in this manner may be used in accordance with the present invention.

As previously pointed out, according to the present invention water is flowed in contact with very slowly water-soluble molecularly dehydrated phosphate whose rate of solution is of an entirely different order from the rate of solution of the rapidly soluble sodium metaphosphate, commonly known as Graham's salt, or sodium hexametaphosphate. When 100 grams of Graham's salt having a particle size of between 8 and 20-mesh is stirred for 10 minutes at 500 R. P. M. in one liter of water at 20° C., it will dissolve in an amount of about 100,000 milligrams. As contrasted with this, when a very slowly soluble molecularly dehydrated phosphate of the type contemplated by the present invention is tested for its rate of solution in the same manner, it will dissolve in an amount of between about 0.5 milligram and about 180 milligrams. From this it can be seen that the rate of solution of the molecularly dehydrated phosphates contemplated by the present invention is less than $1/500$ of the rate of solution of Graham's salt, and in some cases is less than $1/200{,}000$ of the rate of solution of Graham's salt.

The following table gives the rate of solution of various very slowly soluble molecularly dehydrated phosphates which are illustrative of the wide variety of such materials which can be used according to the present invention. The values given in the table are the milligrams of molecularly dehydrated phosphate which are dissolved when 100 grams of the phosphate having a particle size distribution between 8 and 20-mesh is stirred for 10 minutes at 500 R. P. M. in 1 liter of water at 20° C. In preparing the sample a quantity of the phosphate was ground and screened using standard 8-mesh and 20-mesh screens. 100 grams of the phosphate which passed through the 8-mesh screen but was retained on the 20-mesh screen was taken for the test. For comparative purposes the table also shows (Example 14) the rate of solution of Graham's salt.

TABLE I

| | Material | Milligrams of Material Dissolved |
|---|---|---|
| 1 | $NaPO_3II$, crystalline | 15 |
| 2 | 90% $NaPO_3$—10% $B_2O_3$, glass | 20 |
| 3 | $Ca(PO_3)_2$, crystalline | 3 |
| 4 | $CaO.P_2O_5$, glass | 3 |
| 5 | $2CaO.Na_2O.3P_2O_5$, glass | 15 |
| 6 | $CaO.2Na_2O.3P_2O_5$, glass | 180 |
| 7 | $CaO.MgO.2P_2O_5$, glass | 0.5 |
| 8 | $Mg(PO_3)_2$, crystalline | 0.5 |
| 9 | $2MgO.Na_2O.3P_2O_5$, glass | 2 |
| 10 | $KPO_3$, crystalline | 35 |
| 11 | $Sr(PO_3)_2$, crystalline | 4 |
| 12 | $ZnO.P_2O_5$, glass | 5 |
| 13 | $Zn(PO_3)_2$, crystalline | 5 |
| 14 | $Na_2O.P_2O_5$, glass (Graham's salt) | 100,000 |

The values given in Table I showing the milligrams of the molecularly dehydrated phosphate dissolved in carrying out the test were obtained by stirring the molecularly dehydrated phosphate in water at room temperature (20° C.). Change in temperature of the water used in carrying out the test or of the water which is flowed in contact with the molecularly dehydrated phosphate in actual use of the process affects very markedly the rate of solution of the molecularly dehydrated phosphate. A comparison of the rates of solution of three molecularly dehydrated phosphates obtained by carrying out the above referred to test with water at room temperature and with water at 100° C. is given in Table II.

TABLE II

*Rate of solution of molecularly dehydrated phosphates at room temperature and at 100° C.*

| | Material | Milligrams of Material Dissolved | |
|---|---|---|---|
| | | Room Temp. | 100° C. |
| 1 | $2CaO.Na_2O.3P_2O_5$, glass | 15 | 900 |
| 2 | $CaO.MgO.2P_2O_5$, glass | 0.5 | 10 |
| 3 | $BaO.P_2O_5$, glass | 0.1 | 17 |

From Table II it is evident that some materials which are suitable for carrying out the process where the temperature of the water is at room temperature are unsuitable where the water is at 100° C. because the rate of solution of the phosphate at high temperature is excessive. Example 1 of Table II designates such a molecularly dehydrated phosphate. This phosphate when used for treating water at room temperature has a rate of solution of 15 milligrams, according to the test, which is within the range of 0.5 and 180 milligrams, but the rate of solution of 900 milligrams at 100° C. is so high as to make it unsuitable for use according to the present invention at that temperature. Example 2 of Table II is suitable for use either at room temperature or at 100° C. Example 3 of Table II has too low a rate of solution where the water is at room temperature, but is entirely suitable where the temperature of the water is 100° C.

The present invention contemplates the use of any molecularly dehydrated phosphate, the rate of solution of which as determined by the described test is such that an amount of the molecularly dehydrated phosphate between about 0.5 and 180 milligrams is dissolved when the water used in the test is at the temperature at which the water is flowed in contact with the molecularly dehydrated phosphate in actual use in the treatment of water.

In determining the amount of molecularly dehydrated phosphate dissolved in accordance with the test, the stirring is stopped at the end of 10 minutes and a sample of the solution is immediately withdrawn and filtered. The sample of solution is then treated to convert the molecularly dehydrated phosphate to orthophosphate. This can be done by making the solution acid to the extent of 0.45 normal with whatever acid is preferred in the subsequent method of analysis and refluxing for four hours.

To determine the amount of orthophosphate, various standard methods may be employed as set forth in texts on analyses. When not more than 2 milligrams of $P_2O_5$ is present per liter I prefer to employ the Truog and Meyers modification of the Deniges method as described in Industrial and Engineering Chemistry, Analytical Edition, vol. 1, pp. 136–139 (1929). This method may be applied also to samples containing more than 2 milligrams of $P_2O_5$ per liter by suitable dilution of the sample.

For samples containing 4 milligrams or more of $P_2O_5$ per liter, Standard Method D515 of the American Society for Testing Materials may be employed.

After the $P_2O_5$ content of the sample has been determined it is possible to calculate the amount of the molecularly dehydrated phosphate dissolved in the test from its known $P_2O_5$ content. For example, if the solution obtained from the test of a molecularly dehydrated phosphate glass of the composition $2CaO.Na_2O.3P_2O_5$ and containing 71 per cent of $P_2O_5$ were found to contain 11 milligrams of $P_2O_5$ per liter, then the amount of the molecularly dehydrated phosphate glass dissolved would be:

$$11 \times \frac{100}{71} = 15.5 \text{ milligrams}$$

The term "molecularly dehydrated phosphate" is intended to include the metaphosphates, pyrophosphates, tripolyphosphates, glassy phosphates or mixtures or compounds thereof, or the corresponding phosphoric acids or acid salts, since they may be considered as derived from orthophosphoric acid or the salts thereof by dehydration which effects an atomic rearrangement within the phosphate molecule.

The present invention provides a simple method of supplying small quantities of metaphosphate ion or other molecularly dehydrated phosphate ion capable of inhibiting the precipitation of calcium carbonate without resorting to the employment of complicated regulating devices. As a non-limiting example, given merely for the purpose of illustrating one application of the invention, I have found that where molecularly dehydrated phosphate glass having the composition $CaO.P_2O_5$ and of 8–20 mesh size is used in the threshold treatment of calcium bicarbonate water (216 P. P. M. $CaCO_3$), a surface area of approximately 80 square feet of the glass is sufficient for the threshold treatment of water flowing past this surface at the rate of one gallon per minute.

Water insoluble molecularly dehydrated phosphates in the form of broken glass have some definite advantages over materials in the crystalline state, when employed according to the present invention and, therefore, the glassy phosphates rather than the crystalline phosphates are preferred. For example, the glass may be broken to give relatively large particles which are homogeneous and which do not tend to disintegrate during use. By screening the broken glass to give sized lumps, the pressure drop through the dissolving unit may be kept low, and the rate of solution may be controlled. In the course of time, the original material will decrease in size until it has completely dissolved or until the last fine particles have been washed away. The addition of fresh, sized material at intervals will, however, keep the average surface of material exposed to the water approximately constant. Lumps of crystalline material of corresponding size are aggregates of many small crystals which might tend to break apart during continued exposure to the water flowing through the container.

The invention is not limited to the examples or to the preferred manner of practicing the invention, but may be otherwise embodied or practiced within the scope of the following claims:

I claim:

1. The process of inhibiting the precipitation of calcium carbonate from water, which comprises flowing the water in contact with a molecularly dehydrated phosphate having the approximate molar composition $$2CaO \cdot Na_2O \cdot 3P_2O_5$$

at such a rate that molecularly dehydrated phosphate is supplied to the water in an amount effective to inhibit precipitation of calcium carbonate but not over 20 parts per million parts of water.

2. The process of inhibiting the precipitation of calcium carbonate from water, which comprises flowing the water in contact with a molecularly dehydrated phosphate having the approximate molar composition $$CaO \cdot 2Na_2O \cdot 3P_2O_5$$

at such a rate that the molecularly dehydrated phosphate is supplied to the water in an amount effective to inhibit precipitation of calcium carbonate but not over 20 parts per million parts of water.

3. The process of inhibiting the precipitation of calcium carbonate from water, which comprises flowing the water in contact with a molecularly dehydrated phosphate consisting essentially of about 50 mol per cent $P_2O_5$, from about 16 mol per cent to about 33 mol per cent CaO, and from about 33 mol per cent to about 16 mol per cent $Na_2O$ at such a rate that the molecularly dehydrated phosphate is supplied to the water in an amount effective to inhibit precipitation of calcium carbonate but not over 20 parts per million parts of water.

4. The process of inhibiting the precipitation of calcium carbonate from water, which comprises flowing the water in contact with a molecularly dehydrated phosphate having the approximate molar composition $$2MgO \cdot Na_2O \cdot 3P_2O_5$$

at such a rate that the molecularly dehydrated phosphate is supplied to the water in an amount effective to inhibit precipitation of calcium carbonate but not over 20 parts per million parts of water.

5. The process of inhibiting the precipitation of calcium carbonate from water, which comprises flowing the water in contact with a molecularly dehydrated phosphate consisting essentially of about 50 mol per cent $P_2O_5$, from about 16 mol per cent to about 33 mol per cent of oxide of metal selected from the class consisting of calcium and magnesium, and from about 33 mol per cent to about 16 mol per cent $Na_2O$ at such a rate that the molecularly dehydrated phosphate is supplied to the water in an amount effective to inhibit precipitation of calcium carbonate but not over 20 parts per million parts of water.

GEORGE B. HATCH.

REFERENCES CITED

The following references are of record in the file of this patent:

UNITED STATES PATENTS

| Number | Name | Date |
| --- | --- | --- |
| Re. 19,719 | Hall | Oct. 8, 1935 |
| 653,744 | Jewell | July 17, 1900 |
| 948,785 | Lajoie | Feb. 8, 1910 |
| 1,592,126 | Paige | July 13, 1926 |
| 1,903,041 | Hall | Mar. 28, 1933 |
| 1,918,555 | Partridge | July 18, 1933 |
| 1,956,515 | Hall | Apr. 24, 1934 |
| 1,997,256 | Hall | Apr. 9, 1935 |
| 2,041,448 | Zinn | May 19, 1936 |
| 2,098,431 | Partridge | Nov. 9, 1937 |
| 2,102,219 | Raymond | Dec. 14, 1937 |
| 2,130,557 | Munter | Sept. 20, 1938 |
| 2,174,614 | Bornemann et al. | Oct. 3, 1939 |
| 2,235,955 | Williams | Mar. 25, 1941 |
| 2,299,783 | Allen | Oct. 27, 1942 |
| 2,301,429 | Magill | Nov. 10, 1942 |
| 2,304,850 | Rice | Dec. 15, 1942 |
| 2,358,222 | Fink et al. | Sept. 12, 1944 |
| 2,358,965 | Durgin et al. | Sept. 26, 1944 |
| 2,360,730 | Smith | Oct. 17, 1944 |
| 2,370,473 | King | Feb. 27, 1945 |
| 2,374,100 | Jackson | Apr. 17, 1945 |

OTHER REFERENCES

Researches in the Metaphosphates, by Paul Pascal, published in Bulletin de la Societe Chimique de France, vol. 35, 1924, No. 122, pages 1119–1141 and No. 123, pages 1131–1141.